US012457462B2

(12) United States Patent
Pedersen et al.

(10) Patent No.: US 12,457,462 B2
(45) Date of Patent: Oct. 28, 2025

(54) HEARING DEVICE WITH MULTI-SOURCE AUDIO RECEPTION

(71) Applicant: GN Hearing A/S, Ballerup (DK)

(72) Inventors: Brian Dam Pedersen, Karlslunde (DK); Thorkild Find Pedersen, Valby (DK)

(73) Assignee: GN HEARING A/S, Ballerup (DK)

( * ) Notice: Subject to any disclaimer, the term of this patent is extended or adjusted under 35 U.S.C. 154(b) by 338 days.

(21) Appl. No.: 18/085,511

(22) Filed: Dec. 20, 2022

(65) Prior Publication Data

US 2023/0209286 A1 Jun. 29, 2023

(30) Foreign Application Priority Data

Dec. 23, 2021 (DK) ............................ PA 202170671

(51) Int. Cl.
*H04R 25/00* (2006.01)

(52) U.S. Cl.
CPC ........... *H04R 25/70* (2013.01); *H04R 25/505* (2013.01); *H04R 25/554* (2013.01); *H04R 2225/55* (2013.01)

(58) Field of Classification Search
CPC ...... H04R 25/43; H04R 25/554; H04R 5/033; H04R 2420/09; H04R 2420/07; H04R 2225/61; H04R 25/558; H04R 2225/55; H04R 25/04; H04R 2227/003; H04R 25/552; H04R 3/00; H04R 1/1091; H04R 2420/01; H04R 2460/03; H04R 25/70; H04R 25/505; G10L 15/22; G06F 3/165; G06F 3/167
See application file for complete search history.

(56) References Cited

U.S. PATENT DOCUMENTS

| | | | | |
|---|---|---|---|---|
| 2003/0223604 A1* | 12/2003 | Nakagawa | H04M 1/6066 381/311 |
| 2018/0048750 A1* | 2/2018 | Hardi | H04B 1/385 |
| 2021/0144500 A1* | 5/2021 | Yan | H04R 29/005 |
| 2021/0152917 A1* | 5/2021 | Kim | H04R 1/1016 |
| 2021/0255823 A1* | 8/2021 | Kim | G06F 3/165 |
| 2021/0400411 A1* | 12/2021 | Lee | H04W 56/001 |
| 2022/0174688 A1* | 6/2022 | Zhao | H04W 72/569 |
| 2022/0337964 A1* | 10/2022 | Feilner | H04R 25/554 |
| 2023/0297324 A1* | 9/2023 | Yu | H04N 21/4852 700/94 |

* cited by examiner

*Primary Examiner* — Carolyn R Edwards
*Assistant Examiner* — Julie X Dang
(74) *Attorney, Agent, or Firm* — Vista IP Law Group, LLP

(57) ABSTRACT

A hearing device and method for operating a hearing device is provided, the hearing device comprising an interface, a processor, and a memory, wherein the hearing device is configured to receive, via the interface, first audio data from a first audio device; receive, via the interface, second audio data from a second audio device; determine an audio output scheme based on the first audio data and the second audio data; and provide an audio output according to the audio output scheme.

26 Claims, 2 Drawing Sheets

HEARING DEVICE WITH MULTI-SOURCE AUDIO RECEPTION

RELATED APPLICATION DATA

This application claims priority to, and the benefit of, Danish Patent Application No. PA 202170671 filed on Dec. 23, 2021. The entire disclosure of the above application is expressly incorporated by reference herein.

FIELD

The present disclosure relates to a hearing device with multi-source reception and related methods including a method of operating a hearing device.

BACKGROUND

Recent developments within wireless audio streaming from electronic device enable an electronic device to stream wireless audio to a hearing device. However, management of audio sources still remains a challenge for the hearing device.

SUMMARY

Accordingly, there is a need for hearing devices and methods with improved audio source management.

A hearing device is disclosed, the hearing device comprising an interface, a processor, and a memory, wherein the hearing device is configured to receive, via the interface, first audio data from a first audio device; receive, via the interface, second audio data from a second audio device; determine an audio output scheme, e.g. based on the first audio data and/or the second audio data; and provide an audio output, e.g. via a receiver of the interface, according to the audio output scheme.

Further, a method of operating a hearing device comprising an interface, a processor, and a memory is provided, wherein the method comprises receiving, via the interface, first audio data from a first audio device; receiving, via the interface, second audio data from a second audio device; determining an audio output scheme, e.g. based on the first audio data and/or the second audio data; and providing an audio output e.g. via a receiver of the interface, according to the audio output scheme.

It is an important advantage of the hearing device that the hearing device can manage wireless audio streams from multiple audio devices or audio sources.

The present disclosure allows for improved and customized prioritization of audio streams from different audio devices. For example, a user may be allowed to define or customize audio reception in his/her hearing device by assigning priorities or priority rules to different combinations of a plurality of identifiers.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
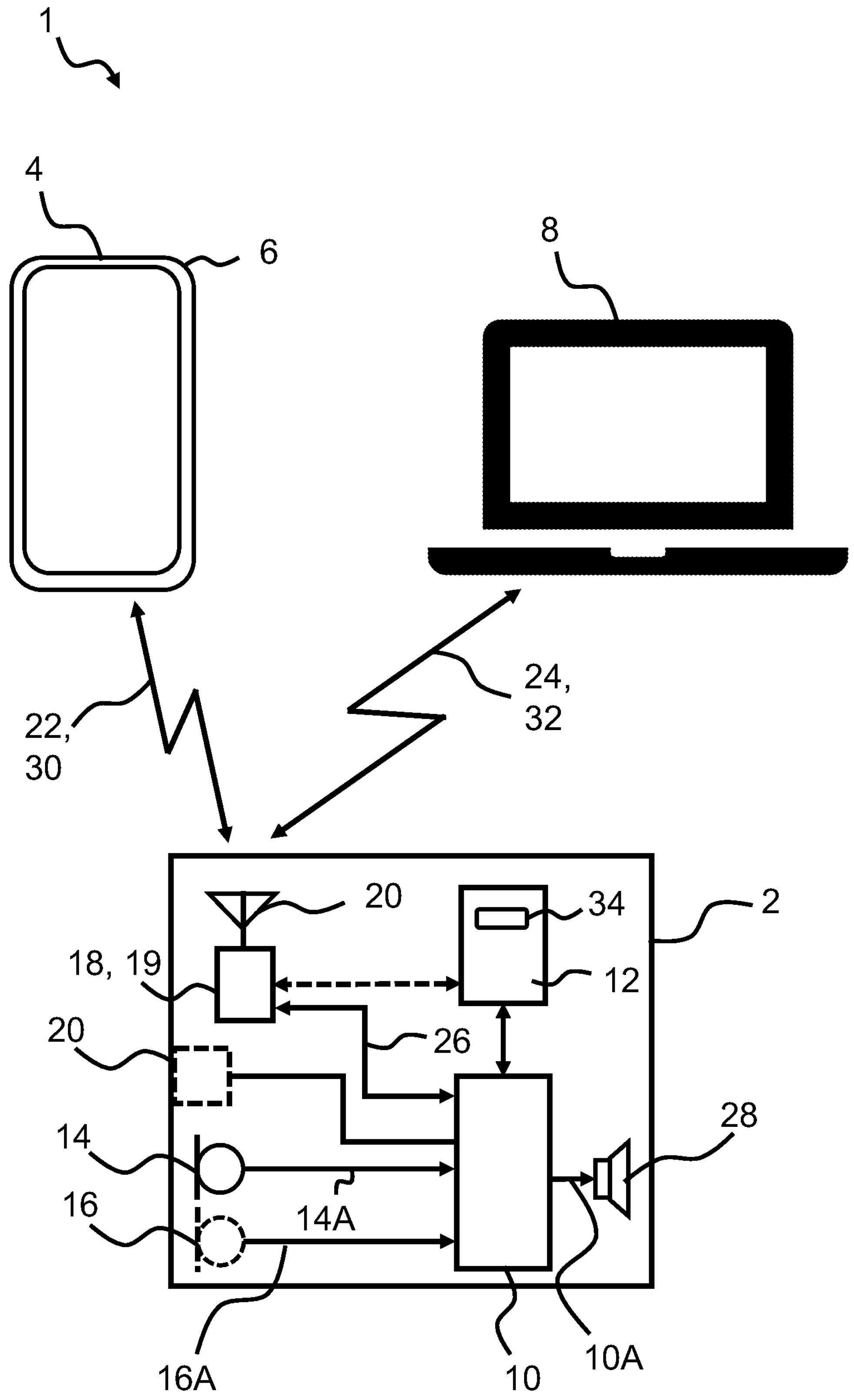
FIG. 1 schematically illustrates an exemplary hearing device.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user. The hearing device may be a hearable. The hearing device may be a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid.

The hearing device comprises an interface, a processor, and a memory.

The hearing device/interface may be configured for wireless communication with one or more audio devices also denoted audio sources. The hearing device/interface may be configured for wireless communication with one or more accessory devices, such as a tablet computer, a laptop computer, a smartphone and/or a smart watch. An accessory device may operate, be, and/or function as an audio device. The hearing device/interface optionally comprises an antenna for converting one or more wireless input signals, e.g. a first wireless input signal and/or a second wireless input signal, to antenna output signal(s). The wireless input signal(s) comprises or are representative of audio data, e.g. the first audio data and/or second audio data. In other words, the audio data may be encoded in the wireless input signal(s). The wireless input signal(s) may origin from external audio source(s), such as audio devices, e.g. spouse microphone device(s), wireless TV audio transmitter(s), music player(s), car(s), doorbell(s), mobile phone(s), smart watch(es), and wireless audio transmitters(s), such as public wireless audio transmitter(s), e.g. in airports, train stations, stadiums, cinemas, and/or arenas. The wireless input signal(s) may origin from one or more accessory devices.

The hearing device/interface comprises a radio transceiver coupled to the antenna for converting the antenna output signal to audio data. Wireless signals from different external sources may be multiplexed in the radio transceiver to audio data or provided as separate audio data on separate transceiver output terminals of the radio transceiver. The hearing device may comprise a plurality of antennas and/or an antenna may be configured to be operate in one or a plurality of antenna modes.

The hearing device may comprise a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device comprises a processor for processing audio data, such as pre-processed transceiver input signal and/or pre-processed microphone input signal(s). The processor provides an electrical output signal based on the input signals/audio data to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

The hearing device may be configured to receive, via the interface, first audio data also denoted AD_1 from a first audio device. The first audio data may be associated or indicative of the first audio device. The first audio data may be associated, or indicative of the audio represented by the first audio data. The first audio data may comprise first sound data of first audio output (audio output) to be provided to the user of the hearing device based on and/or according to the audio output scheme.

The hearing device may be configured to receive, via the interface, second audio data also denoted AD_2 from a second audio device. The second audio data may be associated or indicative of the second audio device. The second audio data may be associated, or indicative of the audio represented by the second audio data. The second audio data may comprise second sound data of second audio output (audio output) to be provided to the user of the hearing device based on and/or according to the audio output scheme.

The hearing device, such as radio transceiver and/or processor, may be configured to determine an audio output scheme based on the first audio data and/or the second audio data. An audio output scheme may define or set which audio device to select from a set of available/streaming audio devices including the first audio device and the second audio device.

The hearing device may be configured to provide, e.g. via a receiver or loudspeaker of the interface, an audio output according to the audio output scheme. In other words, the hearing device may be configured to provide an electrical output according to the audio output scheme and convert the electrical output to audio output using a receiver or loudspeaker of the interface.

In one or more example hearing devices, the hearing device is configured to receive, via the interface, first audio data from a first audio device; receive, via the interface, second audio data from a second audio device; determine an audio output scheme based on the first audio data and the second audio data; and provide, e.g. via a receiver or loudspeaker of the interface, an audio output according to the audio output scheme.

In one or more example hearing devices, the hearing device is configured to: obtain calendar data from a calendar application and/or time data e.g. from an internal clock of the hearing device; and determine the audio output scheme based on the calendar data and/or the time data. Thereby, a user may be able to manage or handle an audio device differently depending on the time of day and/or depending on scheduled user activity. For example, a scheduled teleconference from an audio source may have higher priority than an unscheduled call from the same audio device.

In one or more example hearing devices, the first audio data comprises a first device type identifier also denoted DTI_1, and wherein the hearing device, such as radio transceiver and/or processor, is configured to determine the audio output scheme based on the first device type identifier.

In one or more example hearing devices, the first audio data comprises a first context type identifier also denoted CTI_1, and wherein the hearing device, such as radio transceiver and/or processor, is configured to determine the audio output scheme based on the first context type identifier.

In one or more example hearing devices, the first audio data comprises a first application type identifier also denoted ATI_1, and wherein the hearing device, such as radio transceiver and/or processor, is configured to determine the audio output scheme based on the first application type identifier.

In one or more example hearing devices, the second audio data comprises a second device type identifier also denoted DTI_2, and wherein the hearing device, such as radio transceiver and/or processor, is configured to determine the audio output scheme based on the second device type identifier.

In one or more example hearing devices, the second audio data comprises a second context type identifier also denoted CTI_2, and wherein the hearing device, such as radio transceiver and/or processor, is configured to determine the audio output scheme based on the second context type identifier.

In one or more example hearing devices, the second audio data comprises a second application type identifier also denoted ATI_2, and wherein the hearing device, such as radio transceiver and/or processor, is configured to determine the audio output scheme based on the second application type identifier.

A device type identifier, such as DTI_1 and/or DTI_2, may be selected from a set of device type identifiers also denoted DTI_SET. The set of device type identifiers may comprise a plurality of device type identifiers, such as two, three, four, or more device type identifiers.

For example, DTI_SET may comprise a device type identifier indicative of the audio device being a laptop computer. DTI_SET may comprise a device type identifier indicative of the audio device being a mobile phone. DTI_SET may comprise a device type identifier indicative of the audio device being a smartwatch. DTI_SET may comprise a device type identifier indicative of the audio device being a spouse microphone device. DTI_SET may comprise a device type identifier indicative of the audio device being a wireless TV audio transmitter. DTI_SET may comprise a device type identifier indicative of the audio device being a music player. DTI_SET may comprise a device type identifier indicative of the audio device being a doorbell. DTI_SET may comprise a device type identifier indicative of the audio device being a wireless audio transmitter, such as a public wireless audio transmitter. DTI_SET may comprise a device type identifier indicative of the audio device being an emergency vehicle. DTI_SET may comprise a device type identifier indicative of the audio device being an alarm device. DTI_SET may comprise a device type identifier indicative of the audio device being an "OTHER" device.

In one or more example hearing devices, DTI_SET comprises one or more of the device type identifiers "LAPTOP", "MOBILE PHONE", "EMERGENCY", "SPOUSE MIC", "DOORBELL". In one or more example hearing devices, device type identifiers are numbers each mapped to a specific type of identifier, e.g. according to a protocol. For example a device type identifier "1" may refer to or indicate a doorbell as defined in a protocol.

A context type identifier, such as CTI_1 and/or CTI_2, may be selected from a set of context type identifiers also denoted CTI_SET. The set of context type identifiers may comprise a plurality of context type identifiers, such as two, three, four, or more context type identifiers. For example, CTI_SET may comprise a context type identifier indicative of the context being a phone call. CTI_SET may comprise a context type identifier indicative of the context being music. CTI_SET may comprise a context type identifier indicative of the context being a conference call. For example, CTI_SET may comprise a context type identifier indicative of the context being audio of a video. For example, CTI_SET may comprise a context type identifier indicative of the context being "OTHER" In one or more example hearing devices, CTI_SET comprises one or more of the context type identifiers "PHONE CALL", "MUSIC", "CONF CALL", "VIDEO". In one or more example hearing devices, context type identifiers are numbers each mapped to a specific type of identifier, e.g. according to a protocol. For example, a context type identifier "1" may refer to or indicate a phone call as defined in a protocol.

An application type identifier, such as ATI_1 and/or ATI_2, may be selected from a set of application type identifiers also denoted ATI_SET. The set of application type identifiers may comprise a plurality of application type identifiers, such as two, three, four, or more application type identifiers. For example, ATI_SET may comprise an application type identifier indicative of the application being a conference application, such as Teams™, Zoom™ or others. ATI_SET may comprise an application type identifier indicative of the application being a web browser. ATI_SET may comprise an application type identifier indicative of the application being a multimedia application, such as Netflix™, YouTube™ Apple Music, Spotify, or others. ATI_SET may comprise an application type identifier indicative of the application being a phone call application.

In one or more example hearing devices, ATI_SET comprises one or more of the application type identifiers "CONF APP", "BROWSER", "MEDIA APP", "PHONE CALL APP". In one or more example hearing devices, application type identifiers are numbers each mapped to a specific type of identifier, e.g. according to a protocol. For example, an application type identifier "1" may refer to or indicate a conference application as defined in a protocol.

In one or more example hearing devices, the hearing device, such as radio transceiver and/or processor, may be configured to determine the audio output scheme based on calendar data, such as calendar data indicative of meetings, such as online meetings. For example, the audio output scheme may be based on a start time and/or an end time of a meeting or other appointment. In one or more example hearing devices, the calendar data are included in the audio data, such as the first audio data and/or the second audio data.

In one or more example hearing devices, the calendar data are provided separate from the audio data, e.g. from an accessory device having a calendar application/calendar data stored thereon.

In one or more example hearing devices, to determine an audio output scheme based on the first audio data and the second audio data comprises to determine a first priority also denoted P_1 based on the first audio data and/or to determine a second priority P_2 based on the second audio data. The first priority is indicative of a priority of the first audio data or of the audio received from the first audio device. The second priority is indicative of a priority of the second audio data or of the audio received from the second audio device.

In one or more example hearing devices, the hearing device, such as radio transceiver and/or processor, is configured to determine the first priority based on one or more of first device type identifier, first context type identifier, and first context type identifier of the first audio data. Thus, the first priority may be given as $$P\_1 = f\_1(\mathrm{DTI\_1}, \mathrm{CTI\_1}, \mathrm{ATI\_1}),$$

where f_1 is a priority function or mapping.

In one or more example hearing devices, the hearing device, such as radio transceiver and/or processor, is configured to determine the second priority based on one or more of second device type identifier, second context type identifier, and second context type identifier of the second audio data. Thus, the second priority may be given as $$P\_2 = f\_2(\mathrm{DTI\_2}, \mathrm{CTI\_2}, \mathrm{ATI\_2}),$$

where f_2 is a priority function or mapping.

In one or more example hearing devices, a first priority associated with the first audio data and/or first audio device may be included in the first audio data, and wherein to determine an audio output scheme is based on the first priority of the first audio data. A second priority associated with the second audio data and/or second audio device may be included in the second audio data, and wherein to determine an audio output scheme is based on the second priority of the second audio data. In other words, an audio device may be allowed to assign a priority to the audio transmitted from the audio device.

To determine an audio output scheme based on the first audio data and the second audio data may comprise to set an audio source identifier of the audio output scheme based on the first priority and/or the second priority, for example by selecting the audio device with the highest priority. In one or more example hearing devices, to provide an audio output, e.g. via a receiver or loudspeaker of the interface, according to the audio output scheme comprises to output audio according to the audio source identifier. In other words, the hearing device may be configured to output audio received from the audio device indicated by the audio source identifier of the audio output scheme.

In one or more example hearing devices, to provide an audio output according to the audio output scheme comprises, in accordance with the audio source identifier being indicative of the first audio device, to output audio, e.g. via a receiver or loudspeaker of the interface, based on the first audio data. In other words, the hearing device may be configured to play audio received from the first audio device in accordance with audio output scheme being indicative of the first audio device as the active audio device.

In one or more example hearing devices, to provide an audio output according to the audio output scheme comprises, in accordance with the audio source identifier being indicative of the second audio device, to output audio, e.g. via a receiver or loudspeaker of the interface, based on the second audio data. In other words, the hearing device may be configured to play audio received from the second audio device in accordance with audio output scheme being indicative of the second audio device as the active audio device.

In one or more example hearing devices, to determine an audio output scheme is based on an audio configuration stored in the memory.

The audio configuration may comprise a first device setting. The first device setting also denoted DS_1 may be associated with an audio device of a first type. The audio configuration/first device setting may comprise one or more of a first device priority, a first context priority or a plurality of first context priorities each associated with a context type, and a first application priority or a plurality of first application priorities each associated with an application type. In one or more example hearing devices, to determine a first priority based on the first audio data comprises to determine the first priority based on the first device setting, such as based on one or more of the first device priority, the first context priority, and the first application priority of the audio configuration. In other words, the audio configuration may define a look-up table, a rule-set, a mapping, or a function for determining a first priority. The audio configuration/first device setting may comprise a first device identifier of the first audio device.

The audio configuration may comprise a second device setting. The second device setting may be associated with an audio device of a second type. The audio configuration/second device setting may comprise one or more of a second device priority, a second context priority or a plurality of second context priorities each associated with a context type, and a second application priority or a plurality of second application priorities each associated with an application type. In one or more example hearing devices, to determine a second priority based on the second audio data comprises to determine the second priority based on the second device setting, such as based on one or more of the second device priority, the second context priority, and the second application priority of the audio configuration. In other words, the audio configuration may define a look-up table, a rule-set, a mapping, or a function for determining a second priority. The audio configuration/second device setting may comprise a second device identifier of the second audio device.

An example audio configuration being a look-up table for determining priorities of audio devices transmitting audio data to the hearing device is shown in Table 1 below, where a low number in priority indicates high priority:

TABLE 1

Example audio configuration

| DTI | CTI | ATI | Priority |
|---|---|---|---|
| EMERGENCY | | | 1 |
| DOORBELL | | | 5 |
| SPOUSE MIC | | | 7 |
| TV AUDIO | | | 8 |
| MOBILE PHONE | PHONE CALL | PHONE CALL APP | 10 |
| | CONF CALL | CONF APP | 19 |
| | | BROWSER | 20 |
| | | PHONE CALL APP | 18 |
| | VIDEO | BROWSER | 40 |
| | | MEDIA APP | 25 |
| | MUSIC | BROWSER | 41 |
| | | MEDIA APP | 17 |
| LAPTOP | CONF CALL | CONF APP | 13 |
| | | BROWSER | 14 |
| | VIDEO | BROWSER | 35 |
| | | MEDIA APP | 34 |
| | MUSIC | BROWSER | 45 |
| | | MEDIA APP | 42 |

For example consider a scenario, where the first audio data from the first audio device is music from a media app on a mobile phone and thus the first audio data comprises (DTI_1, CTI_1, ATI_1)=(MOBILE PHONE, MUSIC, MEDIA APP) and the second audio data from the second audio device is a conference call from a conference app on a laptop and thus the second audio data comprises (DTI_2, CTI_2, ATI_2)=(LAPTOP, CONF CALL, CONF APP). The hearing device/processor determines via the audio configuration in Table 1 and based on the first audio data and the second audio data, the first priority of the first device (mobile phone) to "17" and the second priority of the second audio device (laptop) to "13", selects the audio device with the highest priority, i.e. the second audio device (laptop) in this case, and provides an audio output according to the audio output scheme, i.e. the audio of the conference call on the laptop is output via receiver/loudspeaker of the interface.

The audio configuration may comprise a default device setting, e.g. for handling or managing audio device(s) of a type not having a matching device setting stored in the hearing device/audio configuration. The audio configuration/default device setting may comprise one or more of a default priority, a default device priority, a default context priority, and a default application priority.

In one or more example hearing devices, to determine a first priority based on the first audio data comprises to determine whether the audio configuration comprises a first device setting associated with the first audio device, e.g. based on first device identifier of the first audio data, and in accordance with a determination that the audio configuration does not comprise a first device setting, determine the first priority based on the default device setting, such as based on one or more of the default device priority, the default context priority, and the default application priority of the default device setting. In other words, the audio configuration may define a device setting allowing the hearing device to handle incoming audio from audio device with no pre-defined device setting.

The audio configuration may comprise or define different audio configurations/device settings/priorities for different times or time ranges. Thus, the audio configuration may comprise a first audio configuration for a first time range or a first set of time ranges, and a second audio configuration for a second time range or a second set of time ranges. Thereby an audio device may be assigned different device settings for different times.

In one or more example methods, a method for operating a hearing device comprising an interface, a processor, and a memory is provided, wherein the method comprises receiving, via the interface, first audio data from a first audio device; receiving, via the interface, second audio data from a second audio device; determining an audio output scheme based on the first audio data and the second audio data; and providing, e.g. via receiver/loudspeaker of the interface, an audio output according to the audio output scheme.

It is noted that descriptions and features of hearing device functionality, such as hearing device configured to, also apply to methods and vice versa. For example, a description of a hearing device configured to determine an audio output scheme also applies to a method of operating a hearing device, wherein the method comprises determining an audio output scheme, and vice versa. The hearing device disclosed herein may be configured to perform any of the methods herein.

FIG. 1 shows an example hearing system 1 comprising an example hearing device 2, one or more accessory devices, and one or more audio devices. The hearing system comprises one or more of a first accessory device 4, a first audio device 6, and a second audio device 8. As illustrated in FIG. 1, the first accessory device 4 and the first audio device 6 may be implemented in a single device, such as a mobile phone as illustrated in FIG. 1, a tablet computer, a laptop computer, or a personal computer. The second audio device 8 may be a laptop computer as illustrated in FIG. 1, a spouse microphone device, wireless TV audio transmitter, music player, car, doorbell, mobile phone, smart watch, and wireless audio transmitters, such as public wireless audio transmitter, e.g. in airports, train stations, stadiums, cinemas, arenas, and/or emergency vehicles, such as ambulances, police cars, firetrucks, etc.

The hearing device 2 comprises an interface, a processor 10 for provision of an electrical output signal 10A, and a memory 12. The hearing device 2 is a hearing aid, wherein the processor 10 is configured to compensate for a hearing loss of a user.

The interface of hearing device 2 comprises one or more microphones including a first microphone 14 for provision of a first microphone input signal 14A, and optionally a second microphone 16 for provision of a second microphone input signal 16A. The microphones 14, 16 may be omitted.

The interface of hearing device 2 comprises a first wireless communication unit 18 being a transceiver 19 and an antenna 20 coupled to the first wireless communication unit 18 and configured for wireless communication, e.g. with one or more audio devices, such as first audio device 6 and second audio device 8. The transceiver 19 is configured to convert wireless input signal(s) including first wireless input signal 22 from first audio device 6 and second wireless input signal 24 from second audio device 8 to one or more transceiver input signals 26.

The processor 10 is configured to process one or more input signals 14A, 16A, 26 and provide an electrical output signal 10A based on one or more of input signals 14A, 16A, 26.

The interface of hearing device 2 comprises a receiver 28 for converting the electrical output signal 10A to an audio output or audio output signal.

The hearing device 2 is configured to receive, via the interface, such as transceiver 19, first audio data 30 encoded or embedded in first wireless input signal 22 from the first audio device 6.

The hearing device 2 is configured to receive, via the interface, such as transceiver 19, second audio data 32 encoded or embedded in second wireless input signal 24 from the second audio device 8.

The hearing device 2 is configured to determine an audio output scheme based on the first audio data 30 and the second audio data 30. The memory 12 may have stored therein an audio configuration 34, and the hearing device 2 is optionally configured to determine the audio output scheme based on the audio configuration 34, e.g. as outlined above with reference to Table 1.

The hearing device 2 is configured to provide an audio output according to the audio output scheme. The audio output may be based on the first audio data 30 and/or the second audio data 32.

Figure 2:
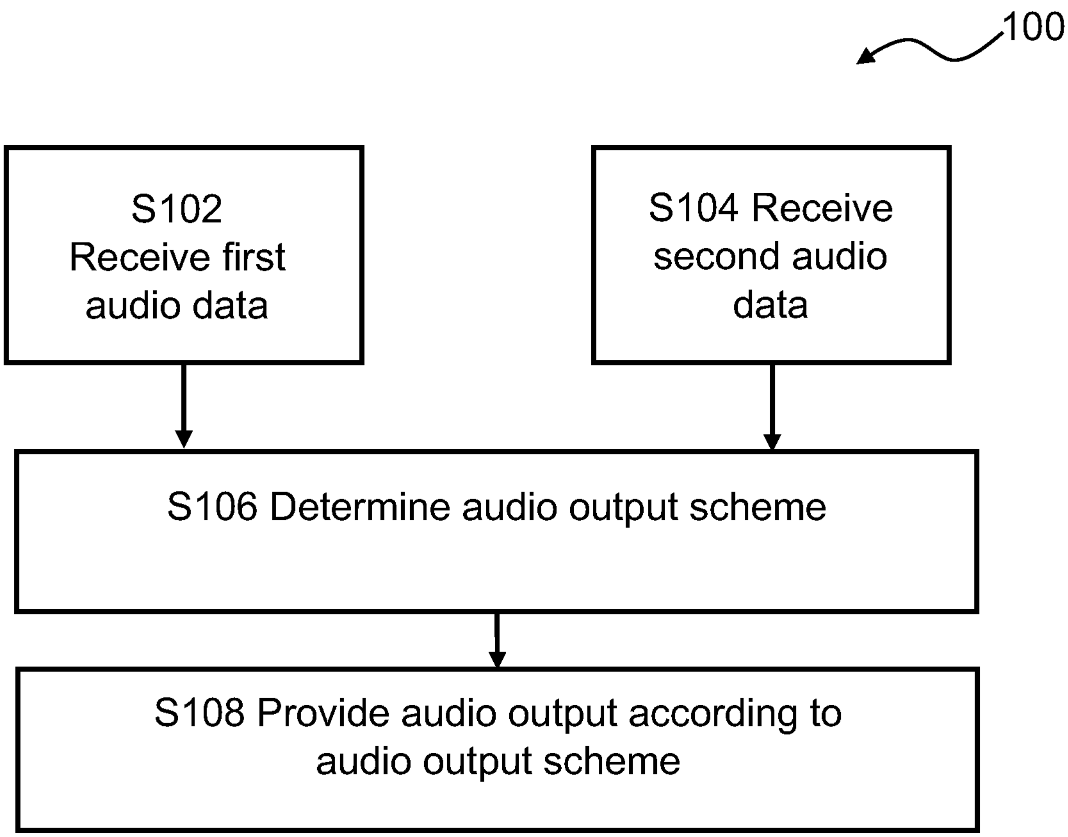
FIG. 2 is a flow diagram of an exemplary method according to the disclosure.

FIG. 2 is a flow diagram of an exemplary method for operating a hearing device comprising an interface, a processor, and a memory, wherein the method 100 comprises receiving (S102), via the interface, first audio data (AD_1) from a first audio device; receiving (S104), via the interface, second audio data (AD_2) from a second audio device; determining (S106) an audio output scheme based on the first audio data (AD_1), such as one or more of a first device type identifier, a first context type identifier, and a first application identifier of the first audio data, and/or the second audio data (AD_2), such as one or more of a second device type identifier, a second context type identifier, and a second application identifier of the second audio data; and providing an audio output, e.g. via receiver/loudspeaker of the interface, according to the audio output scheme.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-2 comprise some modules or operations which are illustrated with a solid line and some modules or operations which are illustrated with a dashed line. The modules or operations which are comprised in a solid line are modules or operations which are comprised in a broad example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word “comprising” does not necessarily exclude the presence of other elements or steps than those listed.

It is to be noted that the words “a” or “an” preceding an element do not exclude the presence of a plurality of such elements.

It should further be noted that any reference signs do not limit the scope of the claims, that the exemplary embodiments may be implemented at least in part by means of both hardware and software, and that several “means”, “units” or “devices” may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1 hearing system
2 hearing device
4 accessory device
6 first audio device
8 second audio device
10 processor/processing unit
10A electrical output signal
12 memory
14 first microphone
14A first microphone input signal
16 second microphone
16A second microphone input signal
18 wireless communication unit
19 transceiver
20 antenna
22 first wireless input signal
24 second wireless input signal
26 transceiver input signal
28 receiver
30 first audio data
32 second audio data
34 audio configuration
100 method for operating a hearing device
S102 receiving, via the interface, first audio data from a first audio device
S104 receiving, via the interface, second audio data from a second audio device
S106 determining an audio output scheme based on the first audio data and the second audio data
S108 providing an audio output according to the audio output scheme

The invention claimed is:

1. A hearing device comprising:
an interface;
a processor; and
a receiver;
wherein the interface is configured to:
receive first audio data from a first audio device, and
receive second audio data from a second audio device;
wherein the hearing device is configured to:
determine a first priority data based on a first parameter in the first audio data;
determine a second priority data based on a second parameter in the second audio data; and
determine an audio output scheme based on the first priority data and the second priority data; and
wherein the receiver is configured to provide an audio output based on the audio output scheme.

2. The hearing device according to claim 1, wherein the first parameter in the first audio data comprises a first device type identifier, and wherein the hearing device is configured to determine the first priority data based on the first device type identifier.

3. The hearing device according to claim 2, wherein the second parameter in the second audio data comprises a second device type identifier, and wherein the hearing device is configured to determine the second priority data based on the second device type identifier.

4. The hearing device according to claim 1, wherein the first parameter in the first audio data comprises a first context type identifier, and wherein the hearing device is configured to determine the first priority data based on the first context type identifier.

5. The hearing device according to claim 4, wherein the second parameter in the second audio data comprises a second context type identifier, and wherein the hearing device is configured to determine the second priority data based on the second context type identifier.

6. The hearing device according to claim 1, wherein the first parameter in the first audio data comprises a first application type identifier, and wherein the hearing device is configured to determine the first priority data based on the first application type identifier.

7. The hearing device according to claim 6, wherein the second parameter in the second audio data comprises a second application type identifier, and wherein the hearing device is configured to determine the second priority data based on the second application type identifier.

8. The hearing device according to claim 1, wherein the hearing device is configured to determine the audio output scheme based on the first audio data and the second audio data by:
setting an audio source identifier of the audio output scheme based on the first priority and the second priority; and
wherein the audio output is based on the audio source identifier.

9. The hearing device according to claim 8, wherein:
the audio output is based on the first audio data if the audio source identifier is indicative of the first audio device, and
the audio output is based on the second audio data if the audio source identifier is indicative of the second audio device.

10. The hearing device according to claim 1, wherein the hearing device is configured to determine the audio output scheme based on an audio configuration.

11. The hearing device according to claim 10, further comprising a memory configured to store the audio configuration.

12. The hearing device according to claim 10, wherein the audio configuration comprises a first mapping between (1) one or more of a first device priority, a first context priority, and a first application priority, and (2) the first priority data.

13. The hearing device according to claim 12, wherein the audio configuration comprises a second mapping between (1) one or more of a second device priority, a second context priority, and a second application priority, and (2) the second priority data.

14. A method performed by a hearing device comprising an interface, a processor, and a receiver, wherein the method comprises:
receiving, via the interface, first audio data from a first audio device;
receiving, via the interface, second audio data from a second audio device;
determine a first priority data based on a first parameter in the first audio data; and
determine a second priority data based on a second parameter in the second audio data;
determining an audio output scheme based on the first priority data and the second priority data; and
providing an audio output based on the audio output scheme.

15. The method according to claim 14, wherein the first parameter in the first audio data comprises a first device type identifier, and wherein the first priority data is based on the first device type identifier.

16. The method according to claim 14, wherein the first parameter in the first audio data comprises a first context type identifier, and wherein the first priority data is based on the first context type identifier.

17. The method according to claim 14, wherein the first parameter in the first audio data comprises a first application type identifier, and wherein the first priority data is based on the first application type identifier.

18. The method according to claim 14, wherein the audio output scheme is determined by:

setting an audio source identifier of the audio output scheme based on the first priority and the second priority; and wherein the audio output is based on the audio source identifier.

19. The method according to claim 18, wherein:

the audio output is based on the first audio data if the audio source identifier is indicative of the first audio device, and the audio output is based on the second audio data if the audio source identifier is indicative of the second audio device.

20. The method according to claim 14, wherein the audio output scheme is based on an audio configuration stored in a memory of the hearing device, the audio configuration comprising: a first mapping between (1) one or more of a first device priority, a first context priority, and a first application priority, and (2) the first priority data.

21. The hearing device according to claim 1, wherein the first priority data is different from the first parameter in the first audio data.

22. The hearing device according to claim 1, wherein the hearing device is configured to determine the first priority data based on a mapping between the first parameter and the first priority data, the hearing device comprising a memory storing the mapping.

23. The hearing device according to claim 1, wherein the first audio data comprises sound data and the first parameter.

24. The method according to claim 14, wherein the first priority data is different from the first parameter in the first audio data.

25. The method according to claim 14, wherein the first priority data is determined by the hearing device based on a mapping between the first parameter and the first priority data, the hearing device comprising a memory storing the mapping.

26. The method according to claim 14, wherein the first audio data comprises sound data and the first parameter.

* * * * *